United States Patent [19]
Bizzini

[11] Patent Number: 4,768,332
[45] Date of Patent: Sep. 6, 1988

[54] ORCHARD HARVESTER VEHICLE

[76] Inventor: Tom Bizzini, 15277 Forest Ranch Way, P.O. Box 493, Forest Ranch, Calif. 95942

[21] Appl. No.: 35,070

[22] Filed: Apr. 6, 1987

[51] Int. Cl.⁴ ............................................. A01D 46/00
[52] U.S. Cl. .................................. 56/340.1; 56/328.1
[58] Field of Search ........................... 56/328.1, 340.1; 144/2 Z; 180/210, 211; 280/62

[56] References Cited

U.S. PATENT DOCUMENTS 4,194,347 3/1980 Peters ................................. 56/340.1
4,409,782 10/1983 Westergard et al. .............. 56/340.1

Primary Examiner—Stephen F. Husar
Attorney, Agent, or Firm—Douglas E. White

[57] ABSTRACT

An orchard harvester vehicle of the type adapted for supporting and transporting means for gripping and shaking trees is disclosed. The vehicle has a frame having three rectilinear legs fixedly connected at inner ends thereof. Each leg defines a longitudinal axis, which axes intersect at the point of interconnection of the inner leg ends in the shape of a "Y" and form three arcuate sectors subtending arcs which together form a full circle. An operator's cab in the first forward sector has a longitudinal axis which is laterally oblique to the line of general advance. An internal combustion motor is operably connected to hydraulic pumps in the second rearward sector. At least one hydraulic wheel motor drives at least one of three ground engaging and traversing wheels. A wheel is pivotally and rotationally mounted at an outer end of each leg for rotation about horizontal axes normal to the general line of advance.

19 Claims, 4 Drawing Sheets

ORCHARD HARVESTER VEHICLE

FIELD OF THE INVENTION

This invention relates to vehicular orchard harvesters, more particularly to an improved tree shaker which reduces the time and maneuvering room needed to position the vehicle for operative engagement between the shaker head and the tree.

BACKGROUND OF THE INVENTION

Various types of vehicles are known which transport shaking devices or "heads" from tree to tree within fruit or nut orchards. The design of most vehicular orchard harvesters is such that the shaking device or "head" may be brought into a gripping relationship with a limb or trunk of a tree only through rather careful maneuvering and precise positioning of the transport vehicle. Other vehicular orchard harvesters include a positioning apparatus which, once the vehicle is proximal to a tree trunk or limb, is operated to bring the shaker head into gripping relationship with the appendage.

However, the freedom of movement of the positioning apparatus is necessarily limited to a small zone closely adjacent to the initial position of the head. Therefore, a great deal of effort has been directed to expanding the maneuverability of the vehicle itself so that the head may be quickly positioned close enough to a tree that minimal adjustment of the head is needed to grip the tree.

Prior art vehicles have been divided into two classes: those that are adapted generally for movement along a line of advance which is parallel to a row of trees, i.e. normal to axes extending radially from the center of a tree; and those that maneuver best by approaching each individual tree head-on, i.e. advance and recede along said radial axes.

The latter "in-and-out" type of vehicle is illustrated in U.S. Pat. No. 4,409,782 to Westergaard et al. That device includes a three wheeled harvester vehicle having two front wheels fixed in position for parallel rotation about a single axis normal to the line of advance and a dirigible or steering rear wheel which rotates about an axis generally parallel to the axis of the front wheels. Head positioning apparatus extends longitudinally outwardly from the front of the vehicle. The vehicle is moved radially inward toward the tree so that the trunk thereof may be grasped by the jaws of the head clamping assembly.

After the tree has been gripped and shaken so that fruit falls onto the ground or into a catching frame, this type of vehicle reverses direction and moves outward on generally the same radial horizontal axis as was used for approach. If on the initial try the head is not close enough to the trunk or limb to be moved in place by the positioning apparatus, then the vehicle must back away from the tree and re-approach. This is an inefficient maneuver from the point of view of time and operator effort.

It is a significant problem that various ground contacting pieces of vehicular apparatus used in the conduct of orchard tree culture are run in close proximity to fruit and nut trees, thereby contributing to additive compaction of the soil surrounding the trees. As most orchard culture methods minimize soil tillage, any compaction becomes a permanent degradation of orchard quality. Compaction decreases the ability of tree root systems to expand and, as well, to absorb essential water and nutrients. The compaction problem is exacerbated by use of vehicular orchard shakers which must, as in the case of in-and-out vehicles, pass over the same ground repeatedly to position the shaking head on the tree.

"Down-the-row" types of shakers generally include a shaker head which is mounted to a carriage capable of inward and outward movement relative to the vehicle along a path transverse to the line of advance of the vehicle, as in U.S. Pat. No. 4,223,515 to Borchard. Another similar vehicle is shown in the patent to Toet, U.S. Pat. No. 3,706,187. The latter vehicle shows a three-wheeled arrangement not unlike that of Westergaard except that the single wheel is on the front, rather than the rear, and all three wheels are steerable. However, this vehicle is advanced parallel to the row of trees. Once it is positioned with its axis of travel perpendicular to an axis extending radially outward from the center of the tree, a laterally extending head engages the tree. After the tree has been shaken, the vehicle moves down the row to a position normal to a horizontal radially extending axis of the next tree. While it is not often necessary to back up such a vehicle, a precise line of travel must be maintained from tree to tree if the shaker head is to continue to come to rest in a grippable zone of adjustment when the vehicle is stopped. The length of such vehicles renders it impractical or impossible to encircle an individual tree.

It will be appreciated from the foregoing that a vehicle is needed which is highly maneuverable within a generally circular zone having a tree trunk as its center and also along a straight path of advance parallel to a row of orchard trees. Such a vehicle must be balanced so as to safely carry bulky head positioning and shaking assemblies. It must also be compact enough to accomplish such maneuvers within the tightly confined space of a densely planted fruit or nut orchard.

SUMMARY OF THE INVENTION

Ordinary three wheeled vehicles have the front two wheels mounted coaxially, with the third wheel's axis of rotation located to the rear of the front wheel's axis and parallel thereto. Such a vehicle may turn by pivoting the front wheels so that their axes of rotation are no longer coincident, but remain parallel (i.e. the wheels turn in parallel in cooperation with each other) or it may turn by pivoting the rear wheel with relation to the front.

The present invention is a orchard harvester shaker transport vehicle that greatly reduces the "travel time" used in positioning the vehicle. The two tandem dirigible wheels, instead of being coaxial, have axes of rotation which are parallel during straight travel and the wheels themselves lie in the same plane. Their axes are also parallel to the axis of the third wheel, but turning is accomplished by simultaneously turning the tandem wheels in opposition to each other—i.e. their axes turn from parallel to intersecting, the point of their intersection being the point about which the vehicle turns.

This allows the shaker transport vehicle to approach the tree from the side, grasp and shake it, and then move forward (down the row) to the next tree in the manner of down-the-row vehicles. Or, the vehicle may travel in a circle about the same tree without having to move back and forth, unlike in-and-out vehicles, to get the shaker head in position. Unlike conventional down-the-row vehicles, this vehicle is compact and maneuverable enough to so circle the tree, grasping one limb after another.

The vehicle's tandem dirigible wheels described above each have independent hydraulic turning and drive apparatus but are operatively coupled for simultaneous and symmetrical turning. The third wheel's axes of rotation is preferably fixed (i.e. the wheel rotates only and does not turn, but acts as a follower), but could also incorporate hydraulic turning apparatus for even sharper turns.

FEATURES AND ADVANTAGES

An object of this invention is to provide a well-balanced tree shaker transport vehicle capable of performing tight maneuvers in the confines of a densely planted commercial nut or fruit orchard. Accordingly, the vehicle disclosed has a frame having three rectilinear legs joined together to form a "T" or"Y" shape, which shape is capable of tight maneuvers without becoming unbalanced. The invention features significantly improved productivity through more rapid positioning of the shaker head.

Another object is to provide an improved vehicular orchard shaker with compact size, decreased overall weight and enhanced maneuverability such that compaction of the orchard floor is minimized. Another object is to provide a compact vehicle which can encircle individual trees.

Accordingly, the legs of the vehicle have axes which together comprise the "T" or "Y" and form sectors subtending arcs which together form a full circle. An operator's cab is mounted obliquely to the line of advance of the vehicle in the first forward circle to allow the operator to see both in front of him and to the side. An internal combustion engine is mounted transversely to the line of travel in the second rearward sector and balances a tree shaker head suspended from a boom in the third lateral sector.

It is a further object of this invention to provide a vehicular orchard orchard shaker harvester which allows more rapid positioning of the shaker head through an improved mechanism for lateral movement, elevation and axial rotation of the shaker head to effectuate the grasping and shaking of tree limbs or trunks at differing attitudes and positions of elevation with respect to the ground.

Yet another object is to disclose a horizontal tubular cross brace fixedly connecting the two legs whose axes form the third sector and supporting in pivotable relation the shaker head assembly from a boom that may be raised and lowered with relation to the ground.

One other object of this invention is to provide a vehicle with designed versatility through which it may be adapted to other uses, such as insecticide spraying, through removal of such components as the boom and the shaker head and the replacement thereof with other orchard maintenance apparatus. Accordingly, the boom may be removed from the cross brace through the release of two pins securing a clevis bracket.

A further object is to disclose hydraulically driven tandem side wheels which normally rotate in the same vertical plane when the vehicle is moving in a straight line of advance, but which can be pivoted vertically about substantially identical horizontal arcs in opposing directions so that their axes of rotation converge at a point. The vehicle will turn sharply about this point in a manner very different from conventional shaker vehicles.

A significant object of this invention is to provide a highly maneuverable harvester to which may be added such further enhancements as an apparatus for catching and transporting the crop to containers as it is shaken from the trees.

It is yet another object of this vehicular orchard harvester to provide an agricultural tool whose design features increased accessibility to points requiring regular maintenance, such as the engine and the hydraulic pumps.

Another object is to provide a vehicle those total weight is supported nearly equally among all wheels of the vehicle, thereby increasing its stability, safety and mobility and decreasing the tendency of any one wheel or group of wheels to compact soil more than others.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention

Figure 1:
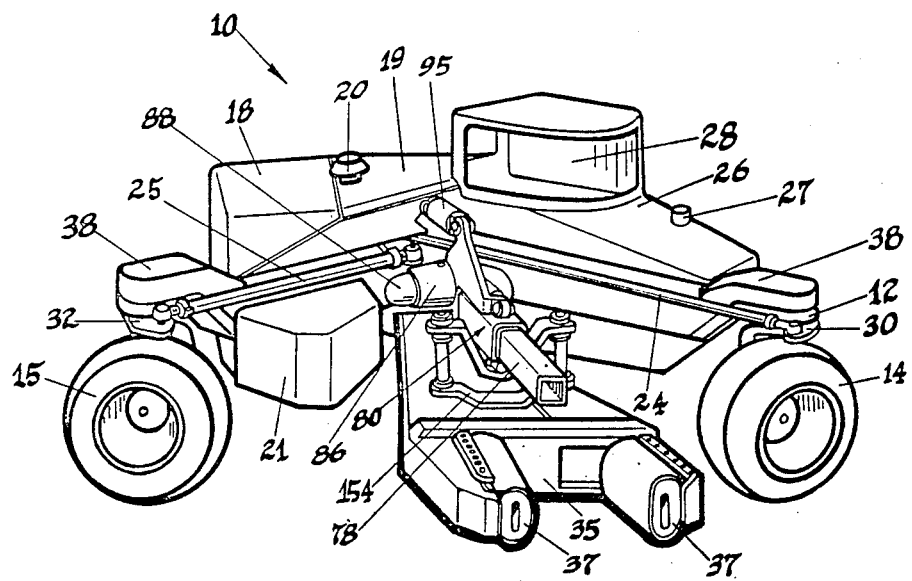
FIG. 1 is a perspective view of a preferred embodiment of a harvester vehicle of the instant invention.

Certain terminology and derivations thereof will be used in the following description for convenience in reference only and will not be limiting. For example, the words "upwardly," "downwardly," "leftwardly," and "rightwardly" will refer to directions in the drawings to which reference is made. The words "inwardly" and "outwardly" will refer to directions toward and away from, respectively, the geometric center of a device and designated parts thereof.

DESCRIPTION OF THE PREFERRED EMBODIMENT

Figure 2:
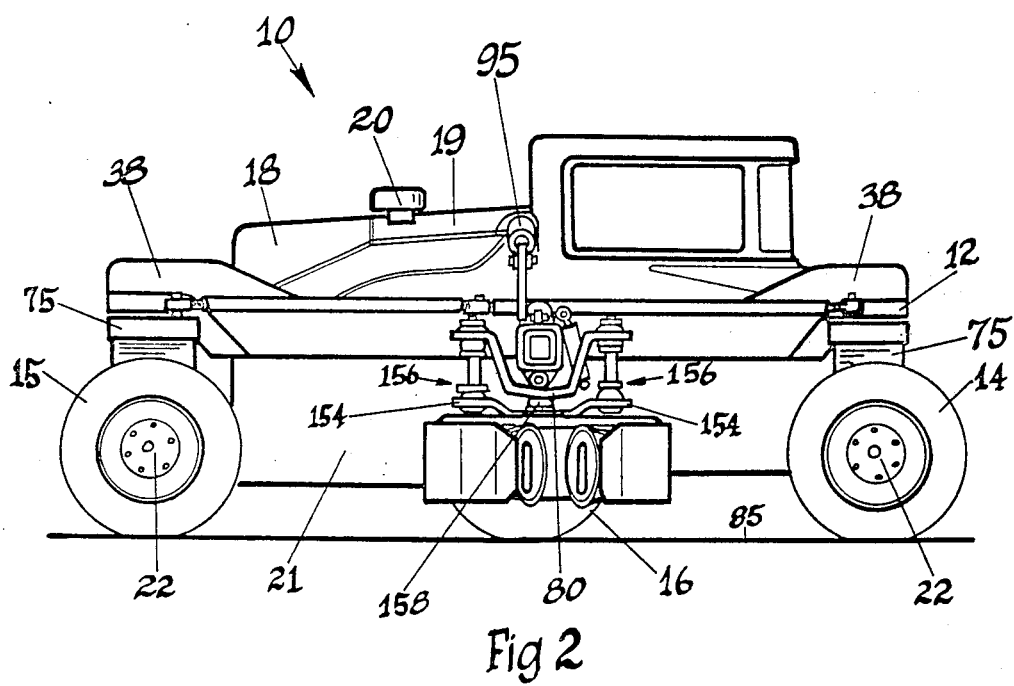
FIG. 2 is a side elevation of the vehicle of FIG. 1.
Figure 3:
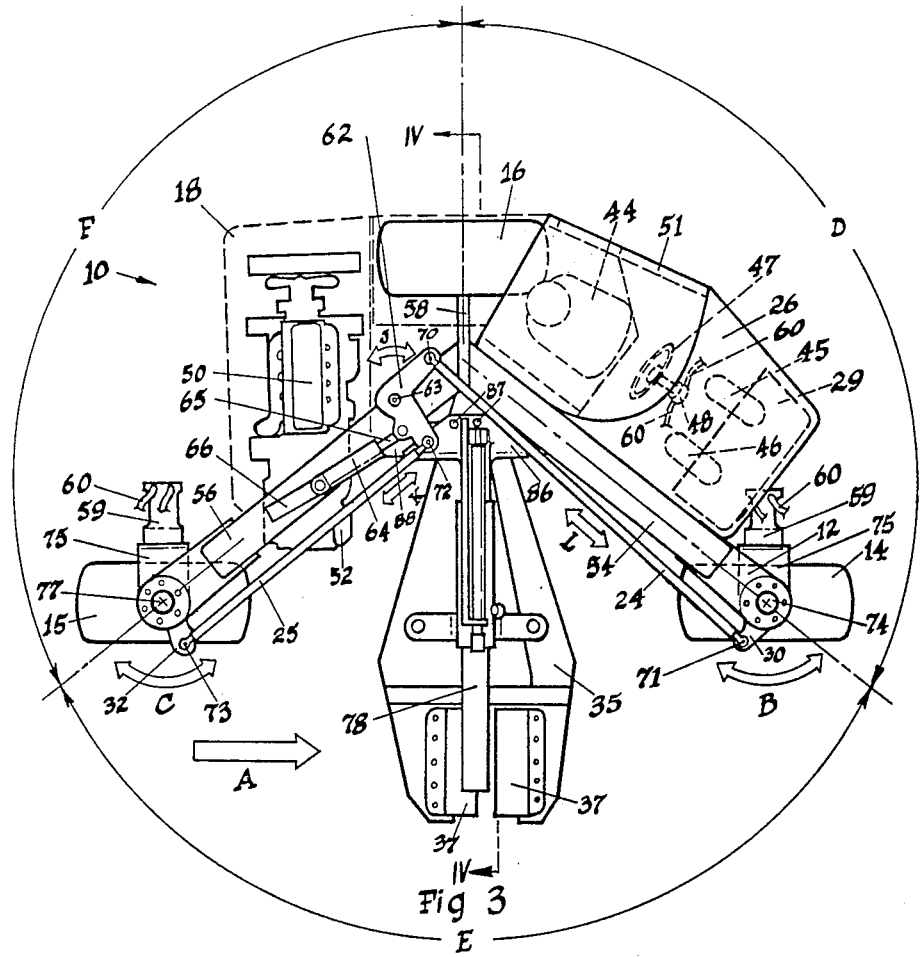
FIG. 3 is a plan view of the vehicle illustrating its trifurcated frame.

As best seen in FIGS. 1-3, an orchard harvester vehicle 10 comprises a trifurcated frame 12 at the outward ends of which are mounted tandem dirigible wheels 14,15 and central wheel 16. The outer housing of vehicle 10 includes an operator's cab 26, engine hood 18, hydraulic fluid medium tank 19 and hydraulic pump cover 21. Fuel tank 29 (shown hidden in FIG. 3) is replenished through filler cap 27. Hydraulic fluid tank 19 is similarly accessed through appropriate filling means (not illustrated). Air filter 20 communicates with internal combustion engine 50.

A suitable shaker head assembly 35 includes opposing jaws 37. The shaker head 35 includes and suitable mechanism, not shown, for imparting a shaking motion to the jaws thereof. This is conventionally achieved through use of a hydraulic motor which drives weighted wheels; although any one of a wide variety of mechanisms and heads are commercially available and can be employed in the instant invention. The particular head illustrated may be obtained from Westech Hydraulics of Ceres, Calif. and is similar to the one disclosed in U.S. Pat. No. 4,409,782 to Westergaard et al., which patent is incorporated herein by reference.

Figure 5:
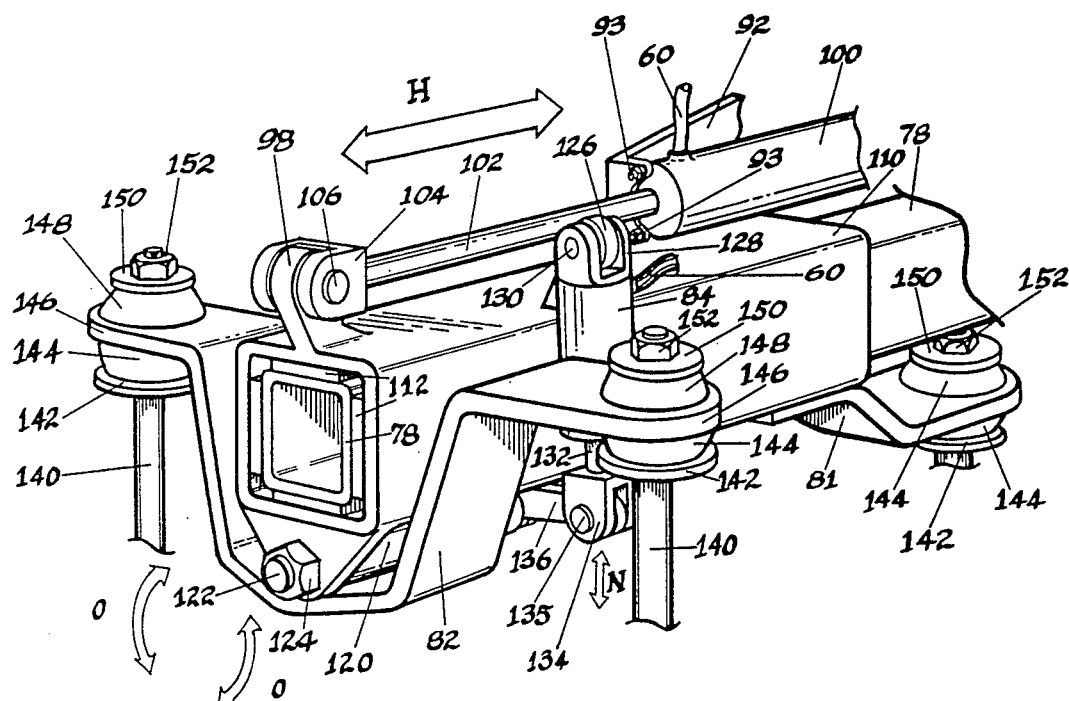
FIG. 5 is an enlarged fragmentary perspective view of the forward portion of the sideshift and roll assembly.

Assembly 35 is suspended from boom 78 by means of head sideshift and roll assembly 80, best seen in FIG. 5 and described in detail hereinbelow. Bracket 154 connects the particular head 35 illustrated to the sideshift and roll assembly 80 by means of depending outward resilient suspension assemblies 156. Inward resilient head suspension assembly 158 (FIG. 2) depends from support flange 81 of assembly 80 (FIG. 5). The head may be attached, however, by any suitable mounting means; the particular dependent resilient bracket assemblies illustrated are shown in more detail in the patent to Westergaard.

Referring now in particular to FIG. 3, it will be seen that the operator's cab 26 is mounted at an angle oblique to the longitudinal axis of the vehicle 10 and the general line of advance A. This allows operator 44 a field of vision through curved windshield 28 extending from the left rear to the right, as seen in FIG. 3, which corresponds to a working view both of the suspension boom 78 supporting the tree clamping shaker head assembly 35 and of the line of advance A.

Operator 44 enters through door 51 and has convenient access to steering wheel 47 and to floor mounted throttle 46 and hydrostatic control pedal 45. The hydraulic linkage and interconnection between controls 45-47, hydrostatic hydraulic pumps 52 and the hydraulic hoses 60 operating the various ram cylinders and hydraulic motors of vehicle 10 is well within the capability of those skilled in the art and will not be described.

Vehicle 10 is supported on a unique trifurcated or "tripod" frame 12. Frame 12 includes forward frame leg 54, rearward frame leg 56 and transverse frame leg 58. Legs 54, 56 are generally of tubular channel steel construction while leg 58 is planar and forms a junction plate for the other two legs. It will be seen that the axes of legs 54, 56, 58 subtend arcs D, E, F of a complete circle.

Although arcs D and F will normally be equal, rendering frame 12 symmetrical about the axis of leg 58, arc E can vary from approximately 100 degrees, as illustrated, up to 180 degrees. In the latter case, frame 12 would be T-shaped, rather having than the Y-shape shown, but the general stability of the tripod frame 12 and the disposition of the vehicle's major constituent parts would not be significantly altered. The size of angle E within the limits noted depends largely on the shape, weight and length of the particular shaker head assembly 35 selected from the large variety commercially available.

Hydraulic hose and steering pivot covers 38 are removably affixed to the upper sides of the outward ends of frame legs 54, 56. L-shaped steering yokes 75 are mounted in reciprocatable relation to the outward ends of legs 54, 56 by means of pivot bearings 74. Yokes 75 rotatably support tandem dirigible wheels 14, 15 and fixedly support hydraulic wheel motor and gear assemblies 59. Fixed or non-steerable central wheel 16 is rotatably supported on spindle shaft 76 extending outwardly from transverse frame leg 58. Hydraulic wheel motor and gear assemblies 59 supply power, via wheel gear boxes 22, for rotating wheels 14,15 to drive vehicle 10 across ground 85 along line of advance A.

Hydraulic ram cylinder 64 is mounted to rear frame leg 56 by protruding flange or lug 66. Rod 65 is pivotally attached to bell crank 62 at a point radially offset from bell crank pivot mount 63. Crank 62 is pivotally connected, in turn, at its radially outward ends to forward 24 and rearward 25 steering tie rods by means of pivots 70, 72, respectively. Tie rods 24, 25 interoperate pivotally with forward 30 and rearward 32 steering arms projecting from yokes 75. Rods 24, 25 are connected to yokes 75 by pivots 71, 73, respectively.

Rotation of steering wheel 47 actuates hydraulic steering valve 48 which is operatively connected to and actuates ram cylinder 64 to extend or retract piston rod 65. Rod 65 turns bell crank 62 about an arc of pivot J, which causes rearward steering tie rod 25 to travel along an axis of retraction/extension K. This allows rear tandem wheel 15 to be steerable about an arc of pivot C, whose center of rotation is a vertical axis passing through the center of bearing 77. Simultaneously, the rotation of crank 62 causes forward steering tie rod 24 to travel along an axis of extension/retraction L steering forward tandem wheel about arc of pivot B, whose center of rotation is a vertical axis passing through the center of bearing 74.

It will be seen that extension of piston rod 65 results in retraction of tie rod 24 and causes a clockwise rotation of forward wheel 14 about arc B. Simultaneously, tie rod 25 retracts, causing an opposed counterclockwise rotation of rearward wheel 15 about arc C. If forward propulsive power is applied with throttle 46 at this point, vehicle 10 will move forward, steering to the operator's right about an axis lying outwardly from the head assembly 35.

Conversely, retraction of piston rod 65 results in extension of tie rod 24 and causes a counterclockwise rotation of forward wheel 14 about arc B. Simultaneously, tie rod 25 extends, causing an opposed clockwise rotation of rearward wheel 15 about arc C. If forward proulsive power is applied, vehicle 10 will move forward, steering to the operator's left about an axis lying outwardly from the fixed central wheel 16.

Figure 4:
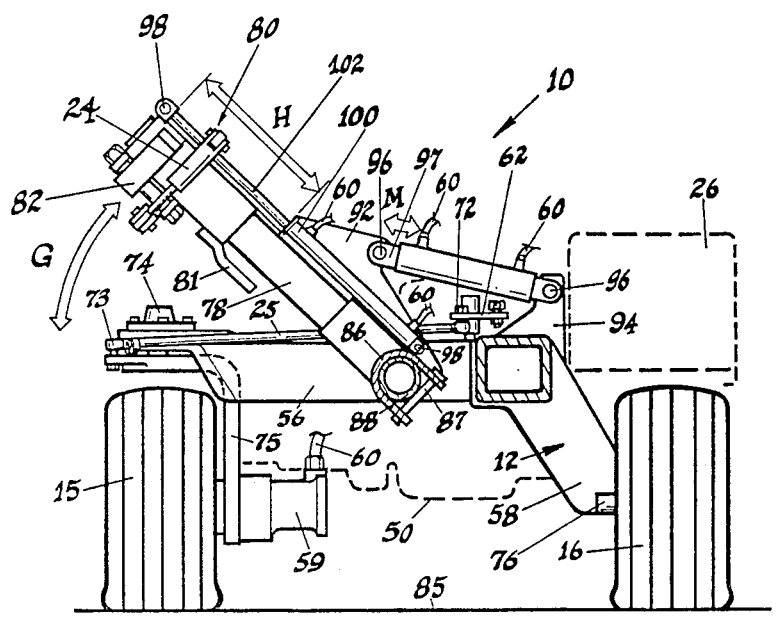
FIG. 4 is an enlarged frontal elevational section taken along line IV—IV of FIG. 3 showing the head sideshift and roll assembly.

The operation of suspension boom 78 will be described with particular reference to FIG. 4, although details thereof are sometimes best viewed in FIGS. 1 and 2.

Boom 80 may be reciprocated upwardly and downwardly about the axis of boom pivot tube 88. Tube 88 forms a longitudinally extending interconnecting brace between frame legs 54, 56. The boom has at its inward end a U-shaped clevis 86 which allows it to be pivotally mounted to pivot tube or brace 88 by removable pins 87. Clevis mount 86 allows the boom 78 and supported assemblies 35, 80 to be conveniently removed and replaced by other orchard apparatus, such as a fertilizer-insecticide sprayer.

Boom elevation hydraulic ram cylinder 95 is connected at its inward end to an ear 94 of frame 12 and at its outward end to a flange 92 projecting from the boom 78. Cylinder 95 is free to pivot about pivot connections 96. Extension or retraction of piston rod 97 through axis M reciprocates boom 80 about arc of pivot G in a vertical plane which is perpendicular to the longitudinal axis, or line of advance A of vehicle 10. This allows head assembly 35 to be lifted or lowered to grasp a tree trunk or a limb at different elevations above the ground 85, as will be described hereinafter.

Sideshift hydraulic ram cylinder 100 lies parallel to the axis of the boom 78 and rotatably attaches at its inward end to clevis 86 and at its outer end to sideshift and roll assembly 80 by means of protruding pivot mounts 98. Activation of cylinder 100 causes piston rod 102 to cause assembly 80 to translate within axis of extension/retraction H in order to allow precise final positioning of head 35 with respect to a tree trunk or limb to be gripped.

Head sideshift and roll assembly 80 is shown in enlarged detail in FIG. 5. Ram piston rod 102 of sideshift ram 100 connects to mounting lug 98 by means of a pivot pin 106 journaled within clevis 104. The outward end of the cylinder of ram 100 is affixed by bolts 93 to boom flange 92.

Lug 98 protrudes from the upper face of a channel sleeve 110 which is enveloped about boom 78. A plastic self-lubricating bearing material 112 is interposed between outer support sleeve 110 and boom tube 78 to allow support sleeve 110 relatively friction free movement along line H for shifting head assembly 35 from side-to-side (transverse to the longitudinal axis of vehicle 10).

Lug mount 126 located midway along the upper face of sleeve 110 pivotally supports clevis 128 of head roll ram cylinder 84. Pivot pin 130 is rotationally journaled within lug 126 and clevis 128.

Piston rod 132 of ram 84 is connected by clevis 134 and pivot pin 135 to the outward end of crank 136. The inward end of crank 136 is fixed to journal sleeve 120. Sleeve 120 is welded to gull wing suspension arm 82 and is free to rotate about roll pivot pin 122 journaled within and affixed thereto and to sleeve 110 by nut 124.

Symmetrically configured suspension assemblies depend from flanges 146 at the right and left ends of arm 82 and inward support flange 81 depending from the lower surface of sleeve 110. Proceeding sequentially downward, head suspension tubes 140 are journaled within, nuts 152, retention collar plates 150, resilient suspension members 148, flanges 146, resilient suspension members 144 and retention collar plates 142. Suspension tubes 140 attach at their lower ends to outward resilient head suspension assembly 156, previously described.

Activation of ram 84 along axis N turns crank 136 to cause gull wing arm 82 to reciprocate about arc of pivot 0. In this manner, the normally horizontal plane of head assembly 35 may be rolled to an angle with respect to the ground to grip a tree trunk or limb that inclines from the vertical.

Figure 6A:
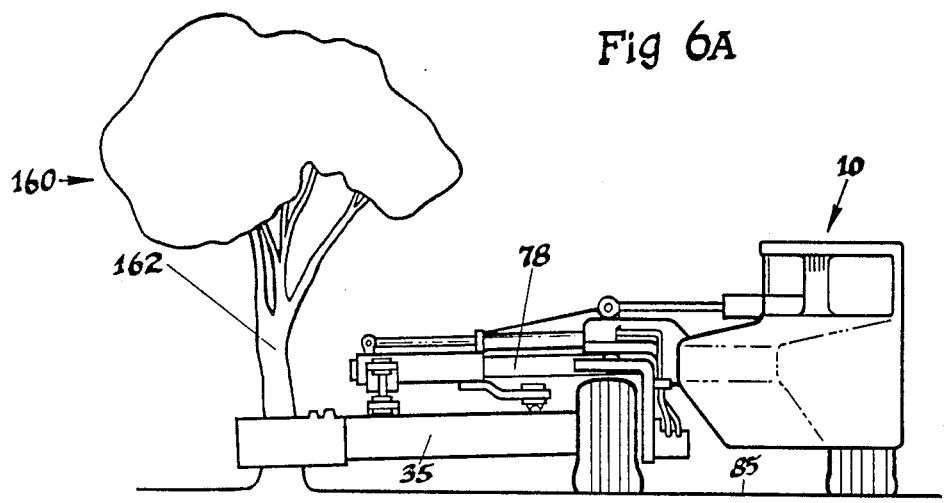
FIG. 6A is an elevation showing the vehicle in a first tree gripping position.
Figure 8:
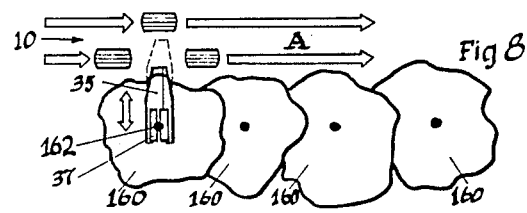
FIG. 8 is a plan view showing a path of advance parallel to a row of trees.

FIG. 6A illustrates operation of orchard harvester vehicle 10 in a first tree gripping and shaking position. Boom 78 is level with the ground and extended outwardly for gripping the trunk 162 of a tree 160 with head 35. FIG. 8 best illustrates the sideshifting of head 35 to properly orient jaws 37 with the trunks of a series of trees 160 when vehicle 10 moves generally linearly along a line of advance A.

Figure 6B:
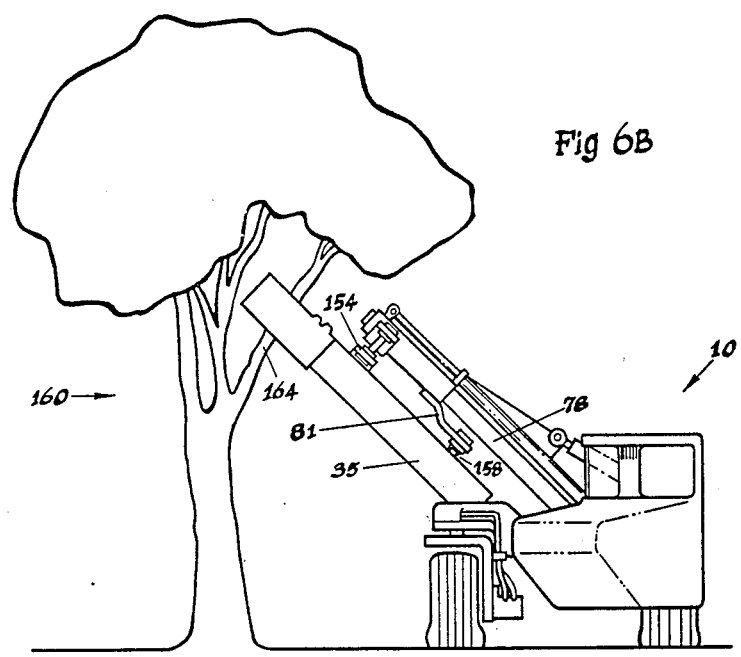
FIG. 6B is an elevation showing the vehicle in a second tree gripping position.
Figure 7:
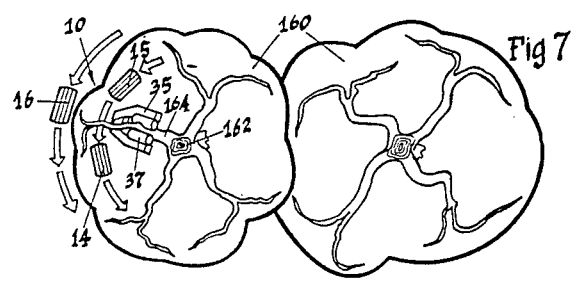
FIG. 7 is a plan view illustrating steering of the vehicle's wheels in a circumferential path of advance about a tree.

After completion of trunk shaking, limb shaking may be desired as shown in FIG. 6B. Boom 78 is then lifted by retraction of rod 97 of elevation ram 95. The head is shifted inwardly slightly to compensate for the decrease in distance of the limb 164 from the vehicle 10 by hydraulic retraction of rod 102 of sideshift ram 100. Prior to gripping limb 164, operation of head roll ram 84 will place head 35 in a plane normal to the axis of limb 164 if the limb is tilted to one side. As seen in FIG. 7, the tree may be continuously circled for gripping and shaking one limb after another in succession with minimal maneuvering.

Figure 9:
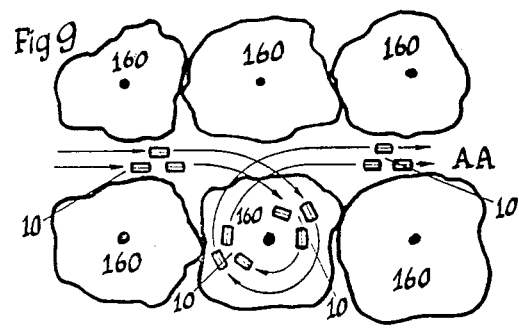
FIG. 9 is a plan view showing steering along a path combining the paths of FIGS. 7 and 8.

FIG. 9 illustrates a line of advance AA that combines both aspects of travel shown in FIGS. 7 and 8. It can be seen that both tree trunks and tree limbs may be approached and shaken within the limited confines of an orchard with this invention in a manner heretofore impossible with either "down-the-row" or "in-and-out" conventional harvester vehicles.

While the above provides a full and complete disclosure of the preferred embodiments of this invention, various modifications, alternate constructions, and equivalents may be employed without departing from the true spirit and scope of the invention. Therefore, the above description and illustrations should not be construed as limiting the scope of the invention which is defined by the appended claims.

I claim:

1. A vehicle adapted generally to traverse a line of advance for operating on a succession of workpieces including:
   a frame having three rectilinear legs fixedly connected at inner ends thereof, each leg defining a longitudinal axis;
   the leg axes intersecting at the point of interconnection of the inner leg ends and forming first, second and third arcuate sectors subtending arcs which together form a full circle,
   the first sector forward with respect to the vehicle and the line of advance,
   the second sector rearward with respect to the vehicle and the line of advance,
   the third sector lateral with respect to the vehicle and the line of advance;
   an operator's cab in the first forward sector; motor means in the second rearward sector; and means for supporting a tool in the third lateral sector,
   whereby the tool support means may be placed in cooperating adjacent relationship with a workpiece situated adjacent to the general line of advance.

2. The vehicle of claim 1, further including:
   means for gripping and shaking a tree supported by the tool support means.

3. The vehicle of claim 2, wherein:
   the cab has a longitudinal axis which is laterally oblique to the line of general advance
   whereby an operator may view the first forward sector and the third lateral sector.

4. The vehicle of claim 2, further including:
   three ground engaging and traversing wheels, one wheel pivotally and rotationally mounted at an outer end of each leg for rotation about horizontal axes normal to the general line of advance.

5. The vehicle of claim 4, further including:
   means for pivoting the wheels on the legs whose longitudinal axes subtend the third sector about vertical wheel pivot axes
   whereby the vehicle may be arcuately steered into successively different lines of advance.

6. The vehicle of claim 5, wherein
the wheel pivoting means simultaneously pivots the wheels about substantially identical arcs in opposing directions.

7. The vehicle of claim 6, wherein the arc subtended by the third sector is from 100 to 180 degrees in extent.

8. The vehicle of claim 6, wherein
the three legs form a "Y" shape.

9. The vehicle of claim 8, wherein
the arc subtended by the third sector is substantially 100 degrees in extent.

10. The vehicle of claim 2, further including:
a horizontal tubular cross brace fixedly connecting the two legs whose axes form the third sector and supporting in pivotable relation the tool support means
whereby the tool support means may be reciprocated about a tool support pivot axis of the cross brace within a plane normal to the ground.

11. The vehicle of claim 10 wherein
the tool support means is a rectilinear boom with a longitudinal boom axis normal to the cross brace and further including
suspension means for suspending a tool in downwardly depending relation from an outward end of the boom, the tool suspension means connected in reciprocally rotational relation about the longitudinal axis of the boom
whereby a tool may be moved from a horizontal position to positions of increasing verticality and may be turned from side to side about the boom axis.

12. The vehicle of claim 11, further including:
a first hydraulic ram cylinder connected at an outer end to the boom at a point mid-range thereof and at an inner end to the frame for reciprocation of the tool support means about the tool support pivot axis of the cross brace.

13. The vehicle of claim 12, further including:
means for reciprocally rotating the tool suspension means about the longitudinal axis of the boom.

14. The vehicle of claim 13, further including:
slidable sleeve means journaling the boom within the tool suspension means; and
means for sliding the sleeve outwardly and inwardly parallel to the longitudinal axis of the boom.

15. An orchard harvester vehicle of the type adapted for supporting and transporting means for gripping and shaking trees, including:
a frame having three rectilinear legs fixedly connected at inner ends thereof, each leg defining a longitudinal axis;
the leg axes intersecting at the point of interconnection of the inner leg ends and forming first, second and third arcuate sectors subtending arcs which together form a full circle,
the first sector forward with respect to the vehicle and the line of advance,
the second sector rearward with respect to the vehicle and the line of advance,
the third sector lateral with respect to the vehicle and the line of advance;
an operator's cab in the first forward sector having a longitudinal cab axis which is laterally oblique to the line of general advance and parallel to one of the leg axes;
an internal combustion engine in the second rearward sector operably connected to hydraulic pump means; at least one hydraulic wheel motor operatively connected to and driven by the hydraulic pump means;
three ground engaging and traversing wheels, one wheel pivotally and rotationally mounted at an outer end of each leg for rotation about horizontal axes normal to the general line of advance, at least one wheel rotationally drivable in ground traversing relation by the at least one hydraulic wheel motor; and
means for supporting the tree gripping and shaking means in the third lateral sector,
whereby the tree gripping and shaking means may be transported and placed in cooperating adjacent relationship with trees situated successively adjacent to the general line of advance.

16. The vehicle of claim 15, further including:
means for pivoting the wheels on the legs whose axes form the third sector about vertical axes
whereby the vehicle may be arcuately steered into successively different lines of advance.

17. The vehicle of claim 16, wherein
the wheel pivoting means simultaneously pivots the wheels about substantially identical arcs in opposing directions.

18. An orchard harvester vehicle of the type adapted for supporting and transporting means for gripping and shaking trees, including:
a frame having three rectilinear legs fixedly connected at inner ends thereof, each leg defining a longitudinal axis;
the leg axes intersecting at the point of interconnection of the inner leg ends and forming first, second and third arcuate sectors subtending arcs which together form a full circle,
the first sector forward with respect to the vehicle and the line of advance,
the second sector rearward with respect to the vehicle and the line of advance,
the third sector lateral with respect to the vehicle and the line of advance;
an operator's cab in the first forward sector having a longitudinal cab axis which is parallel to a leg axis;
an internal combustion engine in the second rearward sector operably connected to hydraulic pump means; at least one hydraulic wheel motor operatively connected to and driven by the hydraulic pump means;
three ground engaging and traversing wheels, one wheel pivotally and rotationally mounted at an outer end of each leg for rotation about horizontal axes normal to the general line of advance, at least one wheel rotationally drivable in ground traversing relation by the at least one hydraulic wheel motor;
a horizontal tubular cross brace fixedly connecting the two legs whose axes form the third sector and supporting in pivotable relation a rectilinear boom with a longitudinal boom axis normal to the the cross brace; and
means for gripping and shaking trees suspended in swingable downwardly depending relation from the boom.

19. The vehicle of claim 18 wherein
the boom is removably connected to the cross brace by a clevis bracket.

* * * * *